United States Patent Office 3,312,478
Patented Apr. 4, 1967

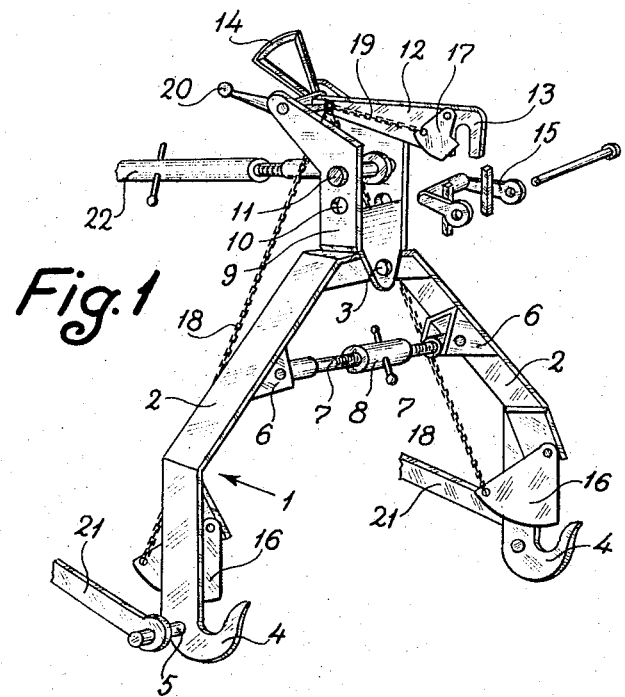
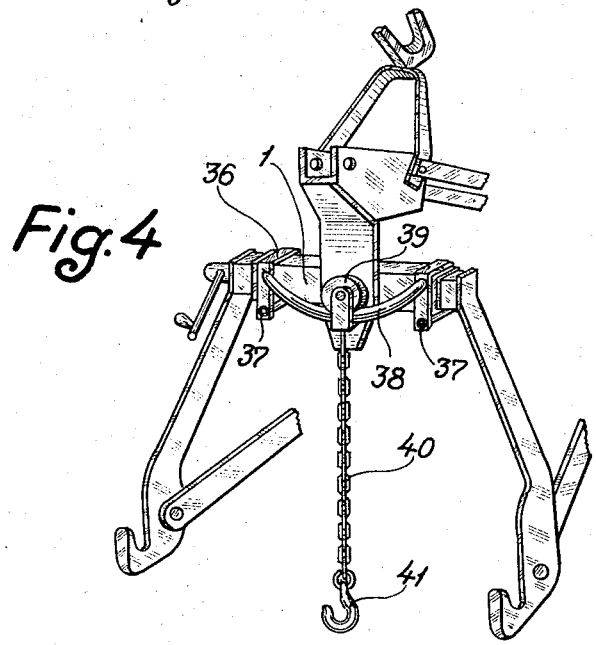

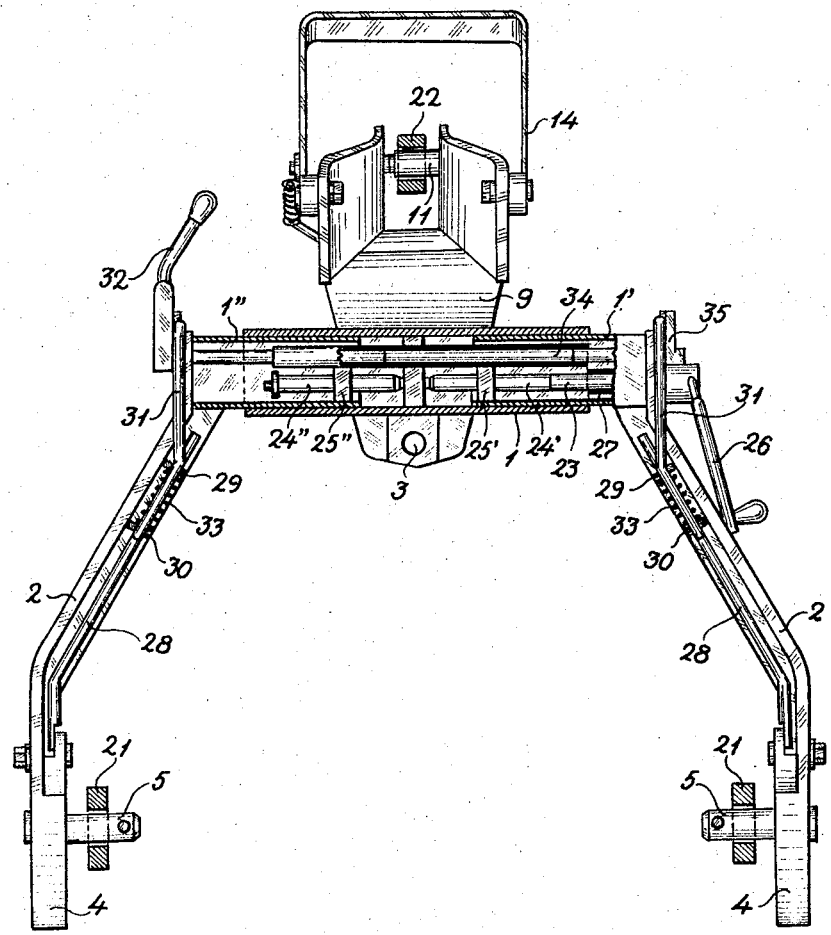

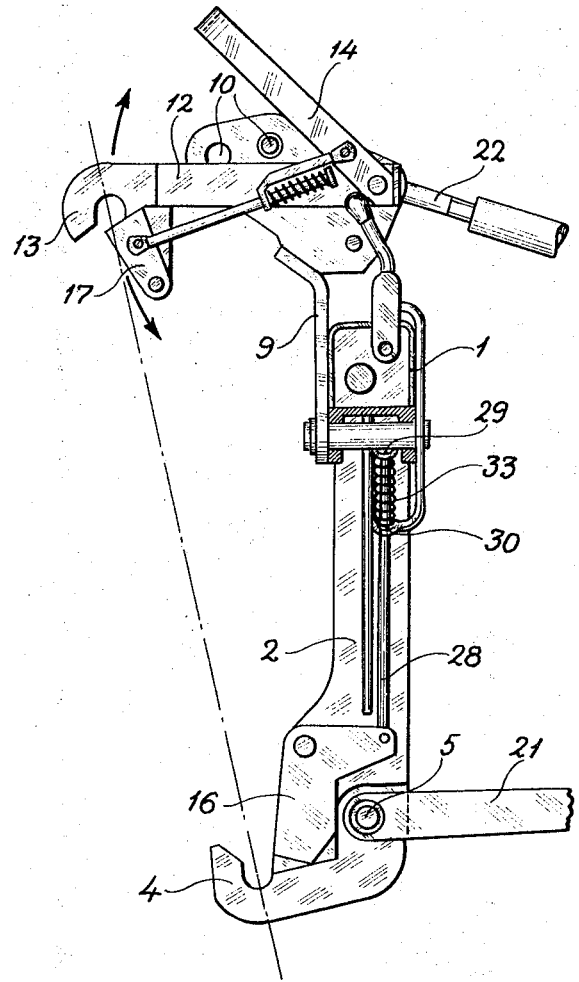

3,312,478
RAPID HITCH DEVICE FOR CONNECTING
IMPLEMENT TO TRACTOR
Risto Jussi Knaapi, Isokyro, Finland
Filed Mar. 30, 1965, Ser. No. 443,887
Claims priority, application Finland, Apr. 1, 1964,
674/64; Dec. 2, 1964, 2,534/64; Jan. 19, 1965,
115/65
9 Claims. (Cl. 280—405)

This invention refers to a rapid hitch device for connecting an implement to a tractor, said hitch device having a frame adapted to be connected to the hitch links of the tractor's 3-point hitch, which frame is provided on one hand with coupling elements adapted to be connected to the lower hitch points of the implement, and on the other hand includes an upper portion intended to be connected to the pushing arm of the 3-point hitch and provided with a coupling element adapted to be connected to the upper hitch point of the implement.

Rapid hitch devices of this type are prior known, by means of which the connecting of different implements to the tractor can be carried out easily and rapidly without necessity for the operator to leave his seat. In this way it is possible to avoid the inconvenience caused by the necessity of positioning the implement by hand so as to permit connection to all three hitch points of the tractor. Particularly the character of agricultural work makes it necessary to change implements several times during the day.

These prior known rapid hitch devices however have the drawback that their frame portion is completely rigid. Because of this the triangle formed between the coupling elements, which corresponds to the triangle formed by the hitch points of the implement, also is completely rigid, whereof the rapid hitch device can not be used for connecting implements where the distances between the hitch points deviate from standard measurements.

The object of this invention is to provide a rapid hitch device of the above described type, in which the angles and the side lengths of the triangle formed by the upper and lower coupling elements can be varied. Another object of the invention is to provide a rapid hitch device which permits the upper hitch point to be moved with reference to the connecting line of the lower hitch points.

The rapid hitch device according to the invention is principally characterized in that the legs of the frame are arranged to be movable in the transverse direction to permit the variation of the angles and the side lengths of the triangle formed between the said coupling elements.

According to a preferred embodiment of the invention the height of the triangle formed between the said coupling elements is also variable in that the coupling element to be connected to the upper hitch point is mounted at the end of an arm or the like pivoting in the vertical plane.

In the following the invention is described in more detail with reference to the embodiments illustrated in the accompanying drawings.

In the drawings FIG. 1 is a perspective view of one embodiment of the rapid hitch device. FIGURES 2 and 3 illustrate another embodiment viewed from behind and from the side respectively, in partial section, and FIG. 4 is a perspective view of a further embodiment.

In FIG. 1 the frame of the rapid hitch device is generally indicated at 1. The frame consists of two legs 2, pivotally interconnected with pivot pin 3. The lower ends of the legs 2 are provided with coupling elements consisting of hooks 4, intended to be connected to the lower hitch points, or the pulling pins, of the implement. The legs 2 are at their lower ends further provided with pins 5, to which the pulling arms of the tractor's lifting device are intended to be connected. To each leg 2 is connected at brackets 6 a threaded spindle 7, with opposing threads, and these spindles are interconnected by means of a sleeve nut 8, provided with corresponding internal threads. Thus, when turning the sleeve nut 8, the legs 2 are turned around pin 3 an equal distance away from or towards each other thus permitting adjustment of the distance between the hooks 4 at will.

The frame 1 further includes a vertical upper portion consisting of two rigidly interconnected legs 9, which portion is connected to the legs 2 by means of pin 3 in a manner to permit lateral pivoting. The legs 9 of the upper portion are provided with apertures 10 for connection of the pushing arm 22 of the 3-point hitch. The connection is made by means of a pin or screw bolt 11. A coupling element, intended to be connected to the upper hitch point of the implement, is pivotably in the vertical plane, connected to the upper end of the upper portion 9, such coupling element in the shown embodiment consisting of an arm 12, provided at its end with a downward opening hook 13, and controllable by means of a handle 14. The hook 13 can be connected to an attachment, pin or the like 15, connected to the upper end of the vertical portion of the implement frame.

Adjacent the hooks 4 are pivotably attached locking elements 16 and adjacent the hook 13 is likewise pivotably attached a locking element 17. The locking elements 16 and 17 are by means of chains or the like 18 and 19 connected to a hand lever 20 for disengaging the locking elements for the purpose of coupling or uncoupling the implement, whereas the locking elements assume their locking position automatically.

The operation of the rapid hitch device according to FIG. 1 is described more particularly later on.

FIGURES 2 and 3 illustrate another embodiment. Here the corresponding parts carry the same reference numbers as in FIG. 1.

The frame comprises a horizontal tubular portion 1, to each end of which are telescopically fitted tubular elements 1', 1'', to which elements the legs 2 of the frame are attached. Inside the frame tube 1 is rotatably supported a shaft 23 comprising two opposedly threaded portions 24', 24'', which are in engagement with correspondingly threaded nut pieces 25', 25'', attached to the inner surfaces of the tube portions 1' and 1''. A hand crank 26 is attached to the end of the shaft 23, projecting out of the frame 1, 1'. For the purpose of varying the length of the shaft 23 as the tubular element 1' is displaced with reference to the tubular portion 1 the hand crank 26 is fitted inside a sleeve member 27, which can be displaced longitudinally with reference to the shaft 23 but transmits the rotational movement to the same. Thus as the hand crank 26 is turned in either direction, the legs 2 are moved an equal distance away from or towards each other thus permitting adjustment of the distance between the hooks 4 at will.

Similarly to the embodiment of FIG. 1, the legs 2 are at their ends provided with hooks 4 and pins 5 for the pulling arms 21 of the tractor's 3-point hitch. Equally the upper portion 9 of the frame is connected to the frame 1 pivotably in the transverse direction around pin 3. The upper portion 9 is likewise provided with apertures 10 for connecting the pushing arm of the tractor's 3-point hitch by means of the pin 11. The coupling hook 13 to be connected to the upper hitch point of the implement, is in this embodiment mounted at the end of a framelike member 12 pivoting in the vertical plane. Further the coupling element 12, 13 can be controlled by means of a handle 14, and adjacent the hooks 4 and 13 there are provided the locking elements 16 and 17.

The formation and the control method of these locking elements however is different to that of the embodiment of FIG. 1. The locking elements provided adjacent the coupler hooks 4 comprise an angle lever 16, which approximately at the point of the angle is pivotably attached to the leg 2 (FIG. 3). At the end of one arm of the angle lever 16 there is pivotably attached a pulling arm 28, which is guided by means of a bracket 29 attached to the leg 2. The pulling arm 28 is influenced through an annular obstacle 30 by a lever 31, which in turn is pivotably attached to a pivotably supported hand lever 32. Between the annular obstacle 30 and the bracket 28 there is provided a spiral spring 33. The locking element 16 thus normally is maintained in the locking position by the influence of the spring 33, in which position it closes the opening of the hook 4, and by turning the hand lever it can be moved into the open position shown in FIG. 3.

For the control of the locking element 16 in the other leg 2, the lever 31 of the corresponding lever system for this locking element is pivotably connected to the arm 35, which in turn is attached to a telescopic shaft 34 provided inside the frame tube and being at one end attached to the hand lever 32. As the control mechanism of the locking element 17 adjacent to the coupler hook 13 is of corresponding design, description of the same is omitted. Be it only stated, that the hand lever 32 can be replaced by a handle 14.

The functioning and operation of the embodiments shown in FIGURES 1 to 3 are described in the following.

The rapid hitch device is attached to the pulling arms 21 and the pushing arm 22 of the tractor in the manner illustrated. The tractor is backed in front of the implement to be connected, with the rapid hitch device low enough to position the coupler hook 4 below the pulling pins of the implement. The distance between the coupler hooks 4 is adjusted by means of the device 7, 8 or 23–27 to correspond to the distance between the pulling pins of the implement. By means of the tractor's hydraulics the rapid hitch device is lifted so that the pulling pins of the implement are locked to the coupler hooks 4 by means of the locking elements 16. To prevent lateral slipping the pulling pins preferably are provided with cotter pins or some such stoppers. The coupler hook in the upper portion of the rapid hitch device is lowered by means of the control handle 14 into the attachment 15 in the upper hitch point of the implement, after which the handle is detached thus permitting the locking device to lock the hook 13. The proper working position of the implement is adjusted in the conventional manner by adjusting the pushing arm 22 and the pulling arms 21. The uncoupling of the implement is carried out in reverse order.

The rapid hitch device described is intended to be continuously kept connected to the pulling and pushing arms of the tractor. This has however the drawback that when the tractor is to be used for trailing an implement or transport device, which is to be connected to the pulling hook or other corresponding pulling means of the tractor by means of a shaft, it is not possible in this case to use the load displacing device known per se, for shifting the load to the rear axle of the tractor and thus improving the pulling capacity and braking effect of the tractor, because the prior known load shifting devices are intended for connection to the lifting device of the tractor, which now is occupied by the rapid hitch device.

Accordingly another object of the invention is to provide an additional device, which permits shifting the load to the rear axle of the tractor by means of the rapid hitch device.

A rapid hitch device of this type is shown in FIG. 4, and it is principally characterized in that the frame of the rapid hitch device is provided with a chain or the like to be connected to the pulling shaft of the implement to be trailed for the purpose of shifting the load in a manner known per se to the rear axle of the tractor through the lifting device of the tractor.

The reference number 1 in FIG. 4 refers to the frame of the rapid hitch device. The rapid hitch device itself can be as shown in FIGS. 2 and 3, so description of the same is here omitted. According to this embodiment an arcuate running track 38 is connected to frame 1 by means of forks 36 and bolts 37, which running track supports a running wheel, which in its turn supports a chain 40. At the end of the chain is attached a hook 41.

For connecting to the tractor of an implement or transporting device provided with a pulling shaft, the chain 40 is put around the pulling shaft and the hook 41 is fastened at a suitable point to the chain 40. By lifting the rapid hitch device by means of the hydraulics of the tractor the chain 40 is tensioned and causes the load to be transferred to the rear axle. Since the running wheel 39 is free to move along the arcuate running track 38 corresponding to the turning of the pulling shaft, the tension of the chain remains constant also in turns.

The chain 40 according to FIGURE 4 can be replaced by any other suitable element such as a rope or an arm of telescopically adjustable length, suitably attached to the pulling shaft. The chain 40 or other corresponding element can also be attached to the end of an arm attached to the frames of the rapid hitch device pivotably in the horizontal plane, in which case the same effect is achieved as in the case of the running wheel 39 moving along the running track 38.

What I claim is:

1. A rapid hitch device for connecting an implement having an upper pushing point and two lower pulling hitch points to a tractor provided with a three-point lifting device having an upper pushing arm and two opposed lower pulling arms, said hitch device comprising a fork-like generally transverse frame having opposed legs, lower coupling elements in the form of upwardly open hooks on the lower ends of the legs adapted for releasable connection to the lower hitch points of the implement, said frame having an upper portion adapted to be connected to the pushing arm of said lifting device, an upper coupling element on the upper portion of the frame adapted to be connected to the upper hitch point of the implement, the upper coupling element being located substantially at the apex of a substantially upright isosceles triangle having the lower coupling elements located at the opposite ends of the horizontal base of the triangle, means to adjust the lower ends of the legs of the frame toward and away from each other whereby to vary the distance between the lower coupling elements, and means including a horizontal longitudinally disposed pivot pin on the frame for pivotally interconnecting the legs, said means to adjust the lower ends of the legs of the frame toward and away from each other comprising an elongated element which is adjustable in length extending between and connected to the legs at its opposite ends, adjustment of said elongated element also varying the angle between the legs.

2. A rapid hitch device as claimed in claim 1, comprising means mounting the upper coupling element on the frame of the device for pivotal movement in a vertical longitudinally extending plane, whereby the height of the triangle formed between the upper and the two lower coupling elements may be varied.

3. A rapid hitch device as claimed in claim 2, wherein the upper coupling element is a downwardly open hook.

4. A rapid hitch device as claimed in claim 3, comprising locking means for the upper and lower coupling elements, and means for selectively operating the locking means.

5. A rapid hitch device as claimed in claim 4, wherein the means for selectively operating the locking means includes means interconnecting the locking means for all of the coupling elements, and means for operating the last named means from the position of the operator of the tractor.

6. A rapid hitch device for connecting an implement having an upper pushing point and two lower pulling hitch points to a tractor provided with a three-point lifting device having an upper pushing arm and two opposed lower pulling arms, said hitch device comprising a fork-like generally transverse frame having opposed legs, lower coupling elements in the form of upwardly open hooks on the lower ends of the legs adapted for releasable connection to the lower hitch points of the implement, said frame having an upper portion adapted to be connected to the pushing arm of said lifting device, an upper coupling element on the upper portion of the frame adapted to be connected to the upper hitch point of the implement, the upper coupling element being located substantially at the apex of a substantially upright isosceles triangle having the lower coupling elements located at the opposite ends of the horizontal base of the triangle, means to adjust the lower ends of the legs of the frame toward and away from each other whereby to vary the distance between the lower coupling elements, the frame comprising a horizontal tubular portion and two further frame elements telescopically interfitting with the respective opposite ends of the tubular portion, means attaching the legs of the frame to said further frame elements, the means for varying the distance between the lower ends of the legs comprising a shaft threaded in opposite hands at its ends extending longitudinally of the horizontal tubular portion and the two further elements of the frame, and nuts on the further frame portions threadedly receiving the shaft, whereby rotation of the shaft moves the two legs equal distances in opposite directions.

7. A rapid hitch device as claimed in claim 6, wherein the implement is adapted to be pulled by the tractor, and such implement has a pulling shaft, comprising a chain or the like connected at a first end to the frame of the rapid hitch device, and means on the other end of the chain for selectively connecting it to the pulling shaft of the implement, whereby the load may be shifted to the rear axle of the tractor through the lifting device.

8. A rapid hitch device as claimed in claim 7, wherein the means connecting the first end of the chain to the frame of the hitch device comprises an arcuate, substantially horizontally disposed running track on the frame of the device, a running wheel on the track, and means connecting the first end of the chain to the wheel.

9. A rapid hitch device as claimed in claim 7, wherein the means connecting the first end of the chain to the frame of the hitch device comprises an arm connected to the frame of the device for pivotal motion in a horizontal plane with respect to the frame, and means connecting the first end of the chain to the outer end of the arm.

References Cited by the Examiner

UNITED STATES PATENTS

| 3,062,561 | 11/1962 | Wulff et al. | 280—405 |
| 3,066,952 | 12/1962 | Price | 280—460 X |
| 3,195,651 | 7/1965 | Todd | 280—461 X |
| 3,220,751 | 11/1965 | Tweedale | 280—461 |

OTHER REFERENCES

Nuber, Josef: German DAS No. 1,107,986, May 31, 1961.

Nuneke, Walter: German DAS No. 1,134,235, Aug. 2, 1962.

LEO FRIAGLIA, *Primary Examiner.*